United States Patent [19]
Koseki

[11] Patent Number: 6,122,307
[45] Date of Patent: Sep. 19, 2000

[54] MANUFACTURING METHOD FOR SOLID STATE LASER

[75] Inventor: Ryoji Koseki, Ishikawa-Ken, Japan

[73] Assignee: Shibuya Kogyo Co., Ltd., Ishikawa-ken, Japan

[21] Appl. No.: 09/059,630

[22] Filed: Apr. 13, 1998

[30] Foreign Application Priority Data

Apr. 24, 1997 [JP] Japan .................................. 9-121598

[51] Int. Cl.⁷ ..................................................... H01S 3/08
[52] U.S. Cl. .............................................................. 372/107
[58] Field of Search ........................................ 372/99, 107

[56] References Cited

U.S. PATENT DOCUMENTS

| | | | |
|---|---|---|---|
| 5,357,539 | 10/1994 | Otani et al. | 372/107 |
| 5,418,810 | 5/1995 | Eguchi et al. | 372/107 |
| 5,572,543 | 11/1996 | Heinemann et al. | 372/107 |

FOREIGN PATENT DOCUMENTS

| | | |
|---|---|---|
| 7-46747 | 3/1988 | Japan . |
| 7-105 575 | 10/1994 | Japan . |
| 8-18164 | 1/1996 | Japan . |

*Primary Examiner*—Rodney Bovernick
*Assistant Examiner*—Robert E. Wise
*Attorney, Agent, or Firm*—Flynn, Thiel, Boutell & Tanis, P.C.

[57] ABSTRACT

A laser diode is initially secured on a substrate, and light emission is caused from the laser diode to radiate light, which is measured by a measuring instrument. The laser diode is positioned at a position where a maximum output is obtained. Subsequently, while continuing light emission from the laser diode, light output which passes through a solid state laser oscillator element with a reflecting surface is measured with the measuring instrument, and the solid state laser oscillator element with a reflecting surface is secured to the substrate at a position where a maximum output is obtained. Subsequently, light emission is caused from the laser diode to excite the solid state laser oscillator element to achieve the resonance of light between the reflecting surface and an output mirror, and laser beam which is output from the solid state laser oscillator element with a reflecting surface and which passes through the output mirror is measured with the measuring instrument, and the output mirror is secured to the substrate at a position where a maximum output is obtained.

88 Claims, 6 Drawing Sheets

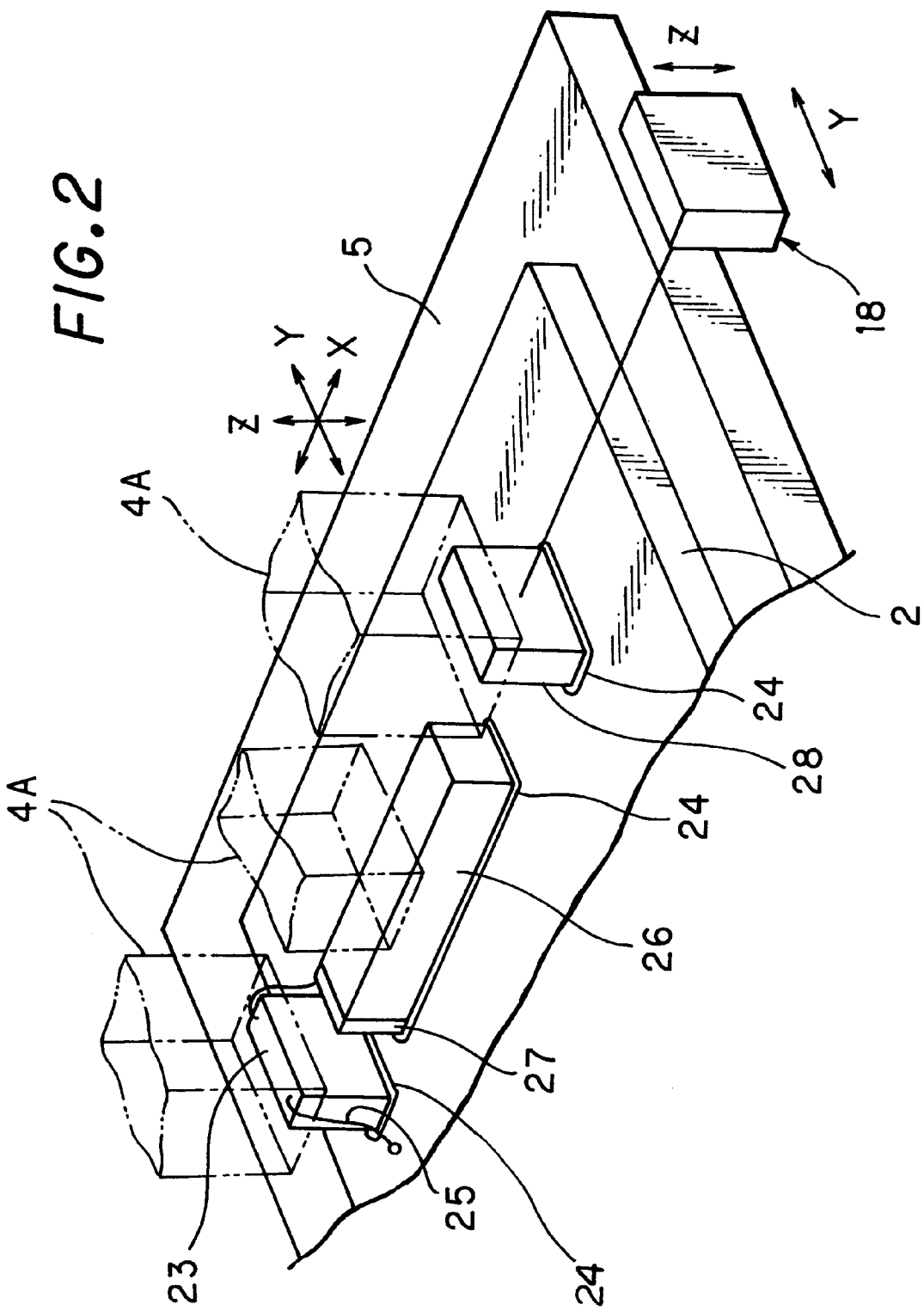

FIG.3

| No | 1 | MEASUREMENT | 2 | MEASUREMENT | 3 | MEASUREMENT | REFERENCE OF MEASUREMENT | TYPE OF MEASURING INSTRUMENT |
|---|---|---|---|---|---|---|---|---|
| 1 | LD | YES | ELEMENT | YES & MOVABLE | OUTPUT MIRROR | YES & MOVABLE | MAXIMUM OUTPUT & OPTICAL AXIS | MOVABLE |
| 2 | LD | YES | ELEMENT | NO | " | " | " | " |
| 3 | LD | NO | ELEMENT | YES | " | " | " | " |
| 4 | ELEMENT | NO | LD | YES | " | " | " | " |
| 5 | LD | YES & MOVABLE | ELEMENT | YES & MOVABLE | " | " | " | FIXED |
| 6 | LD | YES & MOVABLE | ELEMENT | NO | " | " | " | " |
| 7 | LD | NO | ELEMENT | YES & MOVABLE | " | " | " | " |
| 8 | LD | NO | ELEMENT | NO | " | " | " | " |
| 9 | ELEMENT | NO | LD | YES & MOVABLE | " | " | " | " |
| 10 | ELEMENT | NO | LD | NO | " | " | " | " |

FIG. 4

| No | 1 | MEASUREMENT | 2 | MEASUREMENT | 3 | MEASUREMENT | 4 | MEASUREMENT | REFERENCE OF MEASUREMENT | TYPE OF MEASURING INSTRUMENT |
|---|---|---|---|---|---|---|---|---|---|---|
| 11 | LD | YES | REFLECTING MIRROR | YES & MOVABLE | ELEMENT | YES & MOVABLE | OUTPUT MIRROR | YES & MOVABLE | MAXIMUM OUTPUT OPTICAL AXIS | MOVABLE |
| 12 | " | " | ELEMENT | YES & MOVABLE | REFLECTING MIRROR | YES & MOVABLE | " | " | " | " |
| 13 | " | " | REFLECTING MIRROR | YES & MOVABLE | ELEMENT | NO | " | " | " | " |
| 14 | " | " | REFLECTING MIRROR | NO | ELEMENT | YES & MOVABLE | " | " | " | " |
| 15 | " | " | ELEMENT | YES & MOVABLE | REFLECTING MIRROR | NO | " | " | " | " |
| 16 | " | " | ELEMENT | NO | REFLECTING MIRROR | YES & MOVABLE | " | " | " | " |
| 17 | " | " | REFLECTING MIRROR | NO | ELEMENT | NO | " | " | " | " |
| 18 | " | " | ELEMENT | NO | REFLECTING MIRROR | NO | " | " | " | " |
| 19 | REFLECTING MIRROR | NO | LD | YES | ELEMENT | YES & MOVABLE | " | " | " | " |
| 20 | " | " | LD | YES | ELEMENT | YES | " | " | " | " |
| 21 | " | " | LD | NO | ELEMENT | NO | " | " | " | " |
| 22 | " | " | ELEMENT | NO | LD | YES & MOVABLE | " | " | " | " |
| 23 | ELEMENT | NO | LD | YES | REFLECTING MIRROR | YES & MOVABLE | " | " | " | " |
| 24 | " | " | LD | YES | REFLECTING MIRROR | NO | " | " | " | " |
| 25 | " | " | LD | NO | REFLECTING MIRROR | YES | " | " | " | " |
| 26 | " | " | REFLECTING MIRROR | NO | LD | YES | " | " | " | " |

FIG.5

| No | 1 | MEASUREMENT | 2 | MEASUREMENT | 3 | MEASUREMENT | 4 | MEASUREMENT | REFERENCE OF MEASUREMENT | TYPE OF MEASURING INSTRUMENT |
|---|---|---|---|---|---|---|---|---|---|---|
| 27 | LD | YES & MOVABLE | REFLECTING MIRROR | YES & MOVABLE | ELEMENT | YES & MOVABLE | OUTPUT MIRROR | YES & MOVABLE | MAXIMUM OUTPUT & OPTICAL AXIS | FIXED |
| 28 | ″ | ″ | ELEMENT | YES & MOVABLE | REFLECTING MIRROR | YES & MOVABLE | ″ | ″ | ″ | ″ |
| 29 | ″ | ″ | REFLECTING MIRROR | YES & MOVABLE | ELEMENT | NO | ″ | ″ | ″ | ″ |
| 30 | ″ | ″ | REFLECTING MIRROR | NO | ELEMENT | YES & MOVABLE | ″ | ″ | ″ | ″ |
| 31 | ″ | ″ | REFLECTING MIRROR | NO | ELEMENT | NO | ″ | ″ | ″ | ″ |
| 32 | ″ | ″ | ELEMENT | YES & MOVABLE | REFLECTING MIRROR | NO | ″ | ″ | ″ | ″ |
| 33 | ″ | ″ | ELEMENT | NO | REFLECTING MIRROR | YES & MOVABLE | ″ | ″ | ″ | ″ |
| 34 | ″ | ″ | ELEMENT | NO | REFLECTING MIRROR | NO | ″ | ″ | ″ | ″ |
| 35 | LD | NO | REFLECTING MIRROR | YES & MOVABLE | ELEMENT | YES & MOVABLE | ″ | ″ | ″ | ″ |
| 36 | ″ | ″ | ELEMENT | YES & MOVABLE | REFLECTING MIRROR | YES & MOVABLE | ″ | ″ | ″ | ″ |
| 37 | ″ | ″ | REFLECTING MIRROR | YES & MOVABLE | ELEMENT | NO | ″ | ″ | ″ | ″ |
| 38 | ″ | ″ | REFLECTING MIRROR | NO | ELEMENT | YES & MOVABLE | ″ | ″ | ″ | ″ |
| 39 | ″ | ″ | REFLECTING MIRROR | NO | ELEMENT | NO | ″ | ″ | ″ | ″ |
| 40 | ″ | ″ | ELEMENT | YES & MOVABLE | REFLECTING MIRROR | NO | ″ | ″ | ″ | ″ |
| 41 | ″ | ″ | ELEMENT | NO | REFLECTING MIRROR | YES & MOVABLE | ″ | ″ | ″ | ″ |
| 42 | ″ | ″ | ELEMENT | NO | REFLECTING MIRROR | NO | ″ | ″ | ″ | ″ |

FIG.6

| No | 1 | MEASUREMENT | 2 | MEASUREMENT | 3 | MEASUREMENT | 4 | MEASUREMENT | REFERENCE OF MEASUREMENT | TYPE OF MEASURING INSTRUMENT |
|---|---|---|---|---|---|---|---|---|---|---|
| 43 | REFLECTING MIRROR | NO | LD | YES & MOVABLE | ELEMENT | YES & MOVABLE | OUTPUT MIRROR | YES & MOVABLE | MAXIMUM OUTPUT OPTICAL AXIS | FIXED |
| 44 | " | " | LD | YES & MOVABLE | ELEMENT | NO | " | " | " | " |
| 45 | " | " | LD | NO | ELEMENT | YES & MOVABLE | " | " | " | " |
| 46 | " | " | LD | NO | ELEMENT | NO | " | " | " | " |
| 47 | " | " | ELEMENT | NO | LD | YES & MOVABLE | " | " | " | " |
| 48 | " | " | ELEMENT | NO | LD | NO | " | " | " | " |
| 49 | ELEMENT | NO | LD | YES & MOVABLE | REFLECTING MIRROR | YES & MOVABLE | " | " | " | " |
| 50 | " | " | LD | YES & MOVABLE | REFLECTING MIRROR | NO | " | " | " | " |
| 51 | " | " | LD | NO | REFLECTING MIRROR | YES & MOVABLE | " | " | " | " |
| 52 | " | " | LD | NO | REFLECTING MIRROR | NO | " | " | " | " |
| 53 | " | " | REFLECTING MIRROR | NO | LD | YES & MOVABLE | " | " | " | " |
| 54 | " | " | REFLECTING MIRROR | NO | LD | NO | " | " | " | " |

6,122,307

MANUFACTURING METHOD FOR SOLID STATE LASER

FIELD OF THE INVENTION

The invention relates to a manufacturing method for solid state laser.

DESCRIPTION OF THE PRIOR ART

A solid state laser is known in the art which comprises a laser diode, a reflecting mirror, a solid state laser oscillator element and an output mirror disposed in the sequence named.

Laser beam from the laser diode has a wavelength which is distinct from the wavelength of laser beam from the solid state laser oscillator element. The reflecting mirror disposed between the laser diode and the solid state laser oscillator element allows a major portion of laser beam from the laser diode to be transmitted therethrough while reflecting a major portion of laser beam from the solid state laser oscillator element. In this manner, the solid state laser oscillator element is excited efficiently by laser beam from the laser diode which transmits through the reflecting mirror, and laser beam in the solid state laser oscillator element is driven into resonance between the reflecting mirror and the output mirror.

When a laser diode is used alone, it is secured to a substrate in a manner to be described below. Initially, the laser diode is temporarily placed in a movable manner on the substrate which is fixed, and is then energized for light emission. A measuring instrument is used to determine the optical axis of laser beam emitted. On the basis of this result of determination, the position of the laser diode is adjusted so that the optical axis is brought into coincidence with a preset reference axis, whereupon the laser diode is fixed on the substrate (see Japanese Patent Publications No. 46,747/1995 and No. 105,575/1995).

Alternatively, the laser diode may be fixed at a given position while supporting the substrate in a movable manner. The laser diode is energized for light emission, and during the energization, a measuring instrument is used to determine a spot where light emission occurs. The position of the substrate is then adjusted so that a reference point on the substrate is brought into alignment with the spot of light emission, whereupon the laser diode is secured to the substrate (see Japanese Laid-Open Patent Application No. 18,164/1996).

In each arrangement mentioned above, the laser diode is used alone or laser beam therefrom is directly used for an intended application. In this instance, the orientation of the optical axis of laser beam which is emitted from the laser diode is of importance.

By contrast, for a solid state laser which includes a reflecting mirror, a solid state laser oscillator element and an output mirror sequentially disposed in addition to the laser diode, components other than the laser diode or laser diode, reflecting mirror and solid state laser oscillator element as well as output mirror are mounted on a substrate while ascertaining their positions with the aid of a camera alone. However, when the mounting takes place using a camera to ascertain the positions of components, if the components such as output mirror or solid state laser oscillator element could have been secured exactly in place on the substrate, some slight misalignment between optical axes of individual components is unavoidable. It then follows that it is difficult to achieve an exact alignment between the optical axes of all of the components, resulting in a reduction in the efficiency of the solid state laser.

SUMMARY OF THE INVENTION

In view of the foregoing, it is an object of the invention to provide a manufacturing method for solid state laser which allows an exact alignment of optical axes of solid state laser oscillator element, output mirror and the like to be facilitated, thus enabling an improved output.

The manufacturing method according to the invention comprises the steps of executing a mounting of a laser diode on a substrate, the mounting of the laser diode on the substrate including the step of securing the laser diode at a given position on the substrate; causing light emission from the laser diode; measuring light emitted from the laser diode with a measuring instrument, and on the basis of a result of such measurement, moving the laser diode to and positioning it at a position where a maximum output is obtained or where a reference position on the measuring instrument aligns with the optical axis of the light emitted; executing a mounting of a solid state laser oscillator element with a reflecting surface at a given position on the substrate, where the oscillator element is secured; and executing a mounting of an output mirror, the mounting of the output mirror including the steps of causing light emission from the laser diode to excite the solid state laser oscillator element, measuring laser beam which is delivered from the output mirror with the measuring instrument, and on the basis of a result of such measurement, moving the output mirror to a position where a maximum output is obtained or where the optical axis of laser beam aligns with a reference position on the measuring instrument and securing the output mirror on the substrate at such a position In the step of mounting a solid state laser oscillator element, a laser diode which is secured to the substrate is caused to emit light, and light which passes through the solid state laser oscillator element with a reflecting surface or light radiated from the solid state laser oscillator element is measured with the measuring instrument. On the basis of a result of such measurement, the solid state laser oscillator element with a reflecting surface is moved to a position where a maximum output is obtained or where the optical axis of light aligns with a reference position on the measuring instrument, and the oscillator element is secured on the substrate at such position.

The present invention uses a solid state laser oscillator element with a reflecting surface. However, in another aspect of the invention, the reflecting mirror and the solid state laser oscillate element are separate from each other. In this instance, a mounting of a laser diode on the substrate is executed. This mounting includes the step of securing a laser diode at a given position on the substrate. This step is then followed by causing light emission from the laser diode, measuring light emitted from the laser diode with a measuring instrument, and moving the measuring instrument to and positioning it at a position where a maximum output is obtained or where a reference position on the measuring instrument aligns with the optical axis of light. Subsequently follow a mounting of a reflecting mirror and a mounting of a solid state laser oscillator element, thus securing the reflecting mirror and solid state laser oscillator element at given positions on the substrate. Then follows a mounting of the output mirror. This mounting of the output mirror includes the steps of causing light emission from the laser diode to excite the solid state laser oscillator element, measuring laser beam delivered from the output light with the measuring instrument, and on the basis of a result of such measurement, moving the output mirror to a position where a maximum output is obtained or where the optical axis of laser beam aligns with a reference position on the measuring instrument, thus securing the output mirror on the substrate at such position.

It is to be noted that in at least one of the mountings of the reflecting mirror and the solid state laser oscillator element, light emission is caused from the laser diode, and light passing through the reflecting mirror or light passing through the solid state laser oscillator element or light radiated from solid state laser oscillator element is measured with the measuring instrument, and on the basis of a result of such measurement, at least one of the reflecting mirror and the solid state laser oscillator element is moved to a position where a maximum output is obtained or where the optical axis of light aligns with a reference position on the measuring instrument, and the mirror or the oscillator element is secured in place.

In the initial aspect of the invention, during the mounting of the laser diode, light emission is caused from the laser diode, and light emitted from the laser diode is measured with a measuring instrument. The measuring instrument is moved to a position where a maximum output is obtained or where a reference position on the measuring instrument aligns with the optical axis of light emitted, and is positioned at such position. Under this condition, the measuring instrument is positioned and remains at rest on the optical axis of light emitted from the laser diode.

During the subsequent solid state laser oscillator element mounting, light emission is caused from the laser diode which is fixed on the substrate. Light which passes through the solid state laser oscillator element with a reflecting mirror is measured with the measuring instrument, and the oscillator element is moved to a position where a maximum output is obtained or where the optical axis of light aligns with a reference position on the measuring instrument, and is secured to the substrate at such position. Under this condition, the solid state laser oscillator element with a reflecting surface is positioned and secured on an optical axis which joins the laser diode and the measuring instrument.

After the solid state laser oscillator element with a reflecting surface is fixed in position, then follows a mounting of the output mirror where light emission is caused from the laser diode to excite the solid state laser oscillator element. Light from the solid state laser oscillator element is now driven into resonance between the reflecting surface and the output mirror, and laser beam from the solid state laser oscillator element which passed through the output mirror is measured with the measuring instrument, and the output mirror is moved to a position where a maximum output is obtained or where the optical axis of the laser beam aligns with a reference position on the measuring instrument, whereupon the output mirror is secured to the substrate at such position.

It will be seen that the solid state laser oscillator element with a reflecting surface and the output mirror are now positioned on an optical axis which joins the laser diode and the measuring instrument. Accordingly, an exact alignment between the optical axis of the laser diode, the optical axis of the solid state laser oscillator element and the optical axis of the output mirror is facilitated, thereby allowing a laser beam output to be improved as compared with a result achieved with a conventional manufacturing method.

In the second aspect of the invention in which the reflecting mirror and the solid state laser oscillator element are separate from each other, a mounting of the laser diode takes place initially. Light emission is caused from the light diode, and light emitted from the laser diode is measured with a measuring instrument. The measuring instrument is then moved to and positioned at a position where a maximum output is obtained or where the reference position on the measuring instrument aligns with the optical axis of light emitted. In this manner, the measuring instrument is now positioned on the optical axis of the light emitted from the laser diode.

Then follows one of a mounting of the reflecting mirror and a mounting of a solid state laser oscillator element, the other of which follows subsequently.

During the mounting of the reflecting mirror, light emission is caused from the laser diode which is now fixed on the substrate, light passing through the reflecting mirror is measured with the measuring instrument, and the reflecting mirror is moved to a position where a maximum output is obtained or where the optical axis of light aligns with a reference position on the measuring instrument, whereupon the reflecting mirror is secured to the substrate at such position.

During the mounting of the solid state laser oscillator element, light emission is caused from the laser diode which is now fixed to the substrate, light passing through the solid state laser oscillator element or light emitted from the solid state laser oscillator element is measured with the measuring instrument, and the solid state laser oscillator element is moved to a position where a maximum output is obtained or where the optical axis of light aligns with a reference position on the measuring instrument, whereupon the solid state laser oscillator element is fixed to the substrate at such position.

When both the mounting of the reflecting mirror and the mounting of the solid state laser oscillator element are completed, at least one of reflecting mirror and solid state laser oscillator element is positioned and secured on an optical axis which joins the laser diode and the measuring instrument.

Subsequent operation remains the same as mentioned above in connection with the first aspect of the invention. When the mounting of the output mirror is completed, at least of one of the reflecting mirror and the solid state laser oscillator element as well as the output mirror are positioned and secured on the optical axis which joins the laser diode and the output mirror.

Accordingly, an exact alignment between the optical axis of the laser diode, the optical axis of at least one of the reflecting mirror and the solid state laser oscillator element and the optical axis of the output mirror is facilitated, thereby allowing a laser beam output to be improved as compared with a result achieved using a conventional manufacturing method.

Above and other objects, features and advantages of the invention will become apparent from the following description of several embodiments thereof with reference to the attached drawings.

BRIEF DESCRIPTION OF THE DRAWINGS

FIG. 2 is a perspective view illustrating a manufacturing method according to the invention;

FIG. 3 is a chart showing variations in a procedure of a manufacturing method which comprises a mounting of a laser diode, a mounting of a solid state laser oscillator element and a mounting of an output mirror;

FIG. 4 is a chart showing variations in a procedure of a manufacturing method which comprises a mounting of a laser diode, a mounting of a reflecting mirror, a mounting of a solid state laser oscillator element and a mounting of an output mirror;

FIG. 5 is a chart showing further variations in another procedure of a manufacturing method which comprises a mounting of a laser diode, a mounting of a reflecting mirror, a mounting of a solid state laser oscillator element and a mounting of an output mirror; and FIG. 6 is a chart showing additional variations in a further procedure of a manufacturing method which comprises a mounting of a laser diode, a mounting of a reflecting mirror, a mounting of a solid state laser oscillator element and a mounting of an output mirror.

DETAILED DESCRIPTION OF THE EMBODIMENTS

Figure 1:
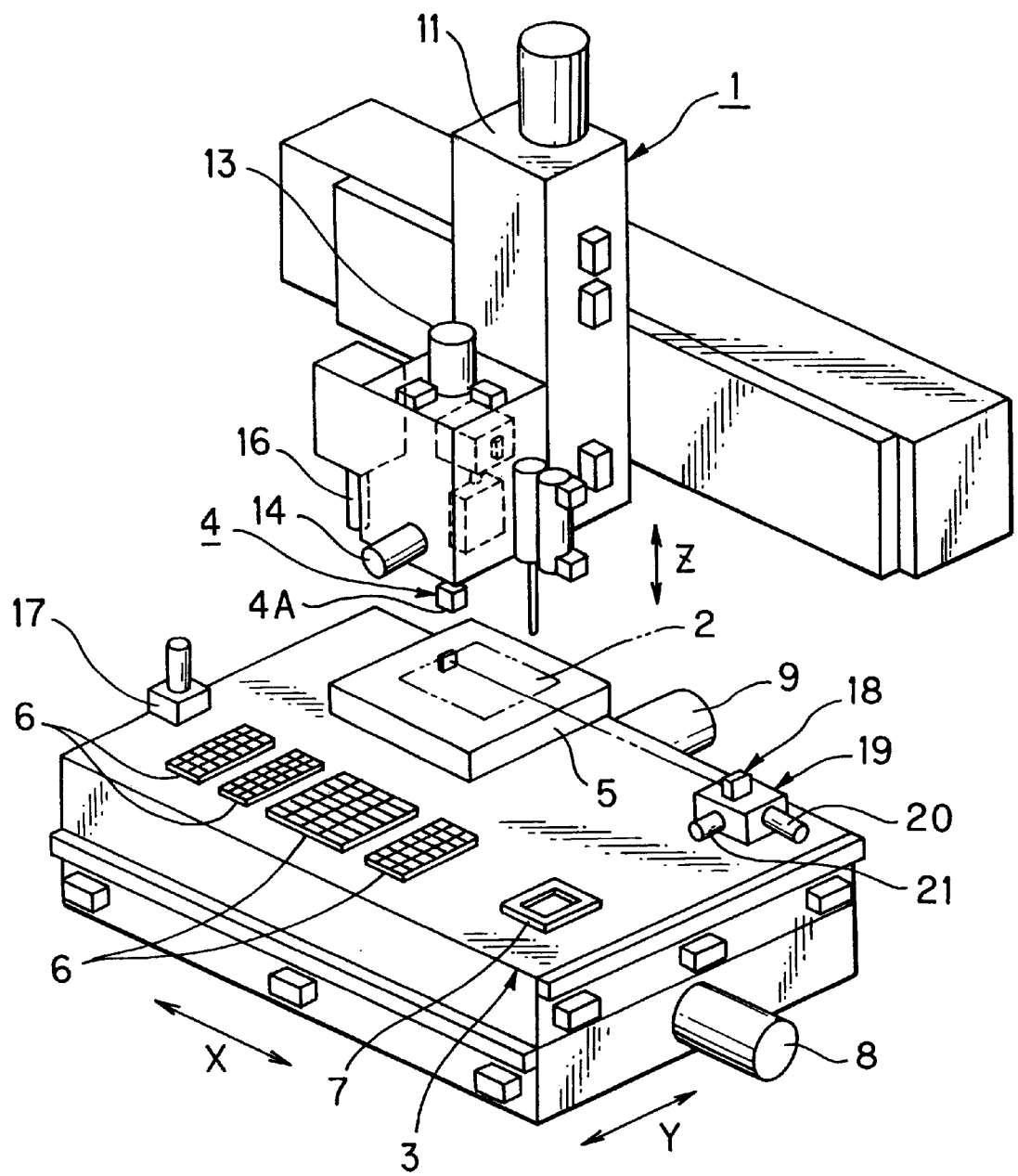
FIG. 1 is a perspective view showing one exemplary form of bonder 1 used in the practice of the invention.
Figure 1:
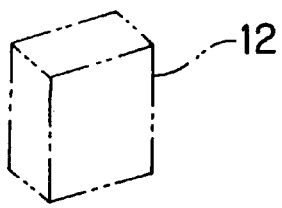

Referring to the drawings, several embodiments of the invention will now be described. Referring to FIG. 1, a bonder 1 is used to bond a solid state laser which is square in configuration and of a small size measuring 2–3 mm on a side to a substrate 2. The bonder 1 includes an X-Y table 3 on which the substrate 2 is placed, which is well known in the art and which is translatable in mutually orthogonal X and Y directions in a horizontal plane. The bonder 2 also includes a bonding tool 4, which is also known in the art, and which acts to hold by attraction various components such as a solid state laser oscillator element in their horizontal positions above the X-Y table 3.

There are an elevated receptacle 5 on which the substrate 2 is placed, a plurality of trays 6 in which components classified according to their varieties are received, and an adhesive vessel 7 containing a reservoir of ultraviolet ray curing resin on the upper surface of the X-Y table 3. The X-Y table 3 can be suitably translated in X and Y directions by an X-motor 8 and a Y-motor 9,whereby the receptacle 5, the trays 6 and the adhesive vessel 7 can be suitably positioned directly below the attracting head 4A of the bonding tool 4.

The bonding tool 4 is mounted on an elevator mechanism 11 which is mounted in a frame, not shown, and can be elevated up and down in the vertical direction or Z direction by means of the elevator mechanism 11. The elevator mechanism 11 is controlled by a controller 12, which is thus capable of elevating the bonding tool 4 through the elevator mechanism 11.

The attracting head 4A of the bonding tool 4 is rotatable about the vertical direction as represented by the Z axis by means of a Z-axis rotation servo motor 13. When the motor 13 is set in motion, the attracting head 4A can be rotated either forwardly or reversely in a horizontal plane, allowing an angle of rotation in the horizontal plane which is assumed by a component which is held attracted by the bottom of the head to be adjusted.

The attracting head 4A is also rotatable about the Y axis by means of a Y-axis rotation servo motor 14. When the servo motor 14 is set in motion, the attracting head 4A can be rocked about the Y axis.

A first camera 16 facing vertically downward is integrally secured to the bonding tool 4 and is disposed at a given location above the X-Y table 3. The first camera 16 is designed to take a picture of the placement of the substrate 2 on the receptacle 5 when the X-Y table 3 is driven to bring the substrate 2 on the receptacle 5 to a location directly below the camera. A picture taken of substrate 2 is input to the controller 12.

The controller 12 is operative to determine offsets in X and Y directions as well as a rotational offset in the horizontal plane of the substrate 2 which is actually placed with respect to a reference position which the substrate 2 should assume originally, on the basis of the picture which is input from the first camera 16. The controller 12 is also operative to determine an offset of a component held attracted by the attracting head 4A with respect to a reference rotational angle in the horizontal plane.

When above offsets are determined, the controller 12 operates to drive the X motor 8 and Y motor 9 by an amount corresponding to the offsets of the substrate 2 in the X and Y directions to correct for the position of the substrate 2,and also drives the Z-axis servo motor 13 by an amount corresponding to the rotational offset of the substrate 2 and of a component to correct for the rotational angle position within the horizontal plane of the component. In this manner, the controller 12 allows the component to be positioned at a given position relative to the substrate 2.

A measuring instrument 18 is integrally mounted at a given location on the X-Y table 3 for measuring a light intensity. In the present embodiment, the measuring instrument 18 comprises photodiodes including four light receptors (not shown) of an identical configuration which are symmetrically disposed on a common plane. This allows a measurement of not only the light intensity, but also of the optical axis of light. Thus, the optical axis of light can be determined from a relative proportion of values determined by the respective light receptors. However, it should be understood that the measuring instrument 18 is not limited to the use of photodiodes, but that thermopiles or pyroelectric heads may also used at this end. When it is desired to measure only the output, a single light receptor having a size which is at least equal to the area covered by the four light receptors may be used.

The measuring instrument 18 is disposed on the upper surface of a Y-Z traveling carriage 19 which is disposed to be movable along Y and X directions relative to the X-Y table 3. The Y-Z traveling carriage 19 can be driven by a Y-direction servo motor 20 and a Z-direction servo motor 21 in a suitable manner to permit the light intensity to be determined at various positions in Y and Z directions, and the measured values are input to the controller 12.

The controller 12 stores measured values which are input from the measuring instrument 18 in a manner corresponding to the travel of the Y-Z traveling carriage 19, and is operative to drive the Y-direction servo motor 20 and Z-direction servo motor 21 in accordance with results of such measurement to move the measuring instrument 18 to a position where a maximum output is obtained for the sum of individual values measured by the respective light receptors or where the individual values measured by the receptive light receptors become equal to each other at the same time. When the individual values measured by the respective light receptors become equal to each other, it follows that the optical axis of light is located at a center position with respect to the respective light receptors, and thus the center position represents a reference position for the optical axis. The arrangement is such that when the maximum output is obtained, the optical axis substantially coincides with the reference position.

When it is desired to determine the optical axis, it is not always necessary that the individual values measured by the respective light receptors be equal to each other. Instead, a relative proportion between the respective light receptors may be previously established, and when a proportion of the measurements from the respective light receptors coincides with the proportion thus established, the measuring instrument can be moved onto the optical axis of the laser diode. In this instance, the optical axis of light will be eccentrically located from the center position of the light receptors, but this position represents the reference position for the optical axis.

A manufacturing method for solid state laser using the bonder 1 mentioned above will now be described in detail with reference to a procedure No. 1 shown in the chart of FIG. 3. In this chart, it should be understood that "LD" represents a laser diode, and an "element" represents a solid state laser oscillator element with a reflecting surface.

Before the bonding process is initiated, a substrate 2 is supplied. The substrate 2 generally comprises a silicon substrate, but a glass substrate or ceramic substrate may be used as well.

During the step of supplying a substrate, a feeder, not shown, supplies a substrate 2 onto the receptacle 5 on the X-Y table 3. The placement of supplied substrate 2 is photographed by the first camera 16, and any positional offset of substrate 2 with respect to a reference position on the receptacle 5 is stored by the controller 12.

Subsequent to the substrate supplying step, a step of mounting a laser diode takes place. In this step, the X-Y table 3 is driven to move a particular one of trays 6 in which a given laser diode 23 is contained to a location directly below the bonding tool 4. The bonding tool 4 is then lowered, and the attracting head 4A holds the laser diode 13 attracted thereto. The bonding tool 4 is then driven upward, and the X-Y table 3 is moved to bring the second camera 17 to a location directly below the attracting head 4A. The second camera 17 takes a picture of the laser diode 23 as it is held attracted by the attracting head 4A, and any offset of the laser diode 23 as it is held attracted with respect to the reference angle of the rotation within the horizontal plane is stored by the controller 12.

After the second camera 17 has taken a picture of the laser diode, the X-Y table 3 is again moved to bring the adhesive vessel 7 to a location directly below the attracting head 4A. The bonding tool 4 is then lower to apply ultraviolet ray curing resin 24 to the lower end face of the laser diode 23. After the application of the resin 24, the X-Y table 3 is moved to bring the substrate 2 at a location directly below the laser diode 23 which is carried by the attracting head 4A.

As mentioned previously, the controller 12 takes any positional offset of the substrate 2 as well as any positional offset of the laser diode 23 into consideration to modify the movement of the X-Y table 3 and the angle of rotation of the laser diode 23 in the horizontal plane so that the laser diode 23 can be accurately positioned at a given position with respect to the substrate 2.

When the laser diode 23 is positioned at a predetermined position with respect to the substrate 2, the bonding tool 4 is lowered to a given elevation to bring the adhering surface of the laser diode 23 which is coated with the ultraviolet ray curing resin 24 into contact with the substrate 2.

Under this condition, an irradiation of ultraviolet ray takes place from a U.V. irradiator, not shown, to cause the ultraviolet ray curing resin 24 to be cured, thereby securing the laser diode 23 in position. When the resin 24 is cured and the laser diode 23 is secured to the substrate 2, the attraction applied to the laser diode 23 by the attracting head 4A is terminated, and the bonding tool 4 is driven upward. This completes the securement of the laser diode.

After securing the laser diode, terminals (not shown) of the secured laser diode are connected to a printed wiring on the back side of the substrate 2 through lead wires 25. Any known wire bonder, not shown, may be used to provide the connection between the terminals of the laser diode 23 and the printed wiring through the lead wires 25.

When the terminals of the laser diode 23 are connected to the printed wiring through the lead wires 25, a current is passed through the printed wiring to the laser diode 23 to cause light emission therefrom. The Y-direction servo motor 20 is then started to cause an incremental reciprocatory motion in the Y direction of the measuring instrument 18 relative to the laser diode 23 while measuring the light output with the measuring instrument 18.

The controller 12 stores the magnitude of an output which is input from the measuring instrument 18 in a manner corresponding to the travel of the Y-Z traveling carriage 19, and selects a position where a maximum output among the stored values is obtained or where the respective light receptors deliver an equal output at the same time. The Y-Z traveling carriage 19 and the measuring instrument 18 are moved to the position where the maximum output is obtained or where the respective light receptors deliver an equal output at the same time, whereupon the Y direction servo motor 20 ceases to operate.

In this manner, the measuring instrument 18 is moved to a position in the Y direction where a maximum output is obtained or where the optical axis of light coincides with a reference position on the measuring instrument or where the respective light receptors deliver an equal output at the same time, and comes to a stop thereat, thus positioning it relative to the laser diode 23.

When there is no input from the measuring instrument 18, the controller 12 determines that the laser diode 23 is a defective one incapable of light emission, and ceases subsequent steps. The substrate 2 and the laser diode 23 which are once mounted are removed, and the process is repeated from the substrate supplying step using a fresh substrate 2.

Subsequently, the controller 12 starts the Z direction servo motor 21 to drive the Y-Z traveling carriage 19 and the measuring instrument 18 up and down through an incremental stroke relative to the laser diode 23 while measuring the output from the measuring instrument 18. In the similar manner as mentioned above, the measuring instrument 18 is moved to a position where a maximum output is obtained or where the respective light receptors deliver an equal output at the same time, and comes to a stop at this position, thus positioning it.

The measuring instrument 18 is now positioned at a position in the Y direction where a maximum output is obtained or where the respective light receptors deliver an equal output at the same time and also at a position in the Z direction where a maximum output is obtained or where the respective light receptors deliver an equal output at the same time. In this manner, the measuring instrument 18 can be positioned on the optical axis of light from the laser diode 23.

When the measuring instrument 18 is positioned on the optical axis of the laser diode 23 in the manner mentioned above, the process then proceeds to a mounting of a solid state laser oscillator element.

In the present embodiment, a solid state laser oscillator element 26 comprises an YAG slab which is provided with a reflecting surface 27 on its rear end. Alternatively, the solid state laser oscillator element 26 may comprise YAG rod, YLF slab, YLF rod, YVO4 slab, YVO4 rod or the like.

The solid state laser oscillator element 26 with a reflecting surface is previously supplied to a given one of trays 6, and is held attracted by the attracting head 4A to have the ultrasonic ray curing resin 24 applied to its lower end face, in the similar manner as mentioned above in connection with the mounting of the laser diode. When the solid state laser oscillator element 26 is positioned at a predetermined position relative to the substrate 2, the bonding tool 4 is driven down to a given elevation, thus bringing the adhering surface of the solid state laser oscillator element 26 which is applied with the ultrasonic ray curing resin 24 into contact with the substrate 2.

The procedure up to this point remains the same as in the mounting of the laser diode.

When the ultrasonic ray curing resin 24 applied to the adhering surface of the solid state laser oscillator element 26 with a reflecting surface moves into contact with the substrate 2, the Y direction motor 9 is activated to cause an incremental reciprocatory motion in the Y direction of the X-Y table 3, and hence of the substrate 2 and the laser diode 23, relative to the solid state laser oscillator element 26 with a reflecting surface, so that light passing through the oscillator element 26 or light output radiated from the oscillator element 26 is measured by the measuring instrument 18 which is positioned at the given position. It is to be noted that at this time, the ultraviolet ray curing resin 24 is interposed between the substrate 2 and the oscillator element 26 while maintaining a contact with both, but because the motion of the oscillator element 26 relative to the substrate 2 is minimal, the resin 24 remains in contact with both the substrate 2 and the oscillator element 26 while being interposed therebetween.

The controller 12 stores the magnitude of an output which is input from the measuring instrument 18 in a manner corresponding to the travel of the X-Y table 3, and selects a position where a maximum output among stored values is obtained or where the respective light receptors deliver an equal output at the same time. The X-Y table 3, the substrate 2 and the laser diode 23 are moved to the position where the maximum output is obtained or where the respective light receptors deliver an equal output at the same time, whereupon the Y direction motor 9 is interrupted. In this manner, the solid state laser oscillator element 26 with a reflecting surface is positioned at the position in the Y direction where a maximum output is obtained or where the respective light receptors deliver an equal output at the same time.

Subsequently, the controller 12 starts the Y-axis rotation servo motor 14 to cause an incremental rotation of the solid state laser oscillator element 26 with a reflecting surface which is held attracted by the attracting head 4A either forwardly or reversely about the Y axis while receiving the output from the measuring instrument 18. In the similar manner as mentioned above, the attracting head 4A and the solid state laser oscillator element 26 with a reflecting surface are moved to a position having an angle of rotation where the maximum output is obtained or where the respective light receptors deliver an equal output at the same time, whereupon the Y-axis rotation servo motor 14 is interrupted.

The controller 12 then proceeds to activating the elevating mechanism 11 to drive the solid state laser oscillator element 26 with a reflecting surface through an incremental stroke up and down in the Z direction, and moves the oscillator element 26 to a position where a maximum output is obtained or where the respective light receptors deliver an equal output at the same time.

The controller 12 then proceeds to activating the Z-axis rotation servo motor 13 to cause a rotation of the solid state laser oscillator element 26 with a reflecting surface either forwardly or reversely about the Z axis through an incremental stroke, and positions the oscillator element 26 at a position having an angle of rotation where a maximum output is obtained or where the respective light receptors deliver an equal output at the same time.

The solid state laser oscillator element 26 with a reflecting surface is then positioned at a position in the Y direction where a maximum output is obtained or where the respective light receptors deliver an equal output at the same time, a position having an angle of rotation about the Y axis where a maximum output is obtained or where the respective light receptors deliver an equal output at the same time, a position in the Z direction where a maximum output is obtained or where the respective light receptors deliver an equal output at the same time, and a position having an angle of rotation about the Z axis where a maximum output is obtained or where the respective light receptors deliver an equal output at the same time. This allows the solid state laser oscillator element 26 with a reflecting surface to be positioned on the optical axis of the laser diode 23.

After the solid state laser oscillator element 26 with a reflecting surface is positioned on the optical axis in the manner mentioned above, an irradiation of a ultraviolet ray takes place from a U.V. irradiator and is directed to the ultrasonic ray curing resin 24, which then becomes cured, thus securing the solid state laser oscillator element 26 with a reflecting surface to the substrate 2. When the resin 24 is completely cured, the attraction applied to the oscillator element 26 by the attracting head 4A is terminated, and the bonding tool 4 is driven upward, thus completing the mounting of the solid state laser oscillator element with a reflecting surface.

It will be understood that during the mounting of the solid state laser oscillator element, light emission is caused from the laser diode 23. What is measured at this time by the measuring instrument 18 is light from the laser diode 23 which has passed through the solid state laser oscillator element 26 with a reflecting surface or light radiated from the solid state laser oscillator element 26 with a reflecting surface as it is excited by the light from the laser diode 23, or so-called fluorescence.

A mounting of an output mirror follows the mounting of the solid state laser oscillator element. In the similar manner as during the mounting of the solid state laser oscillating element, the ultrasonic ray curing resin 24 is applied to the output mirror 28, which is then positioned at a position in the Y direction where a maximum output is obtained or where the respective light receptors deliver an equal output at the same time, a position having an angle of rotation about the Y axis where a maximum output is obtained or where the respective light receptors deliver an equal output at the same time, a position in the Z direction where a maximum output is obtained or where the respective light receptors deliver an equal output at the same time, and a position having an angle of rotation about the Z axis where a maximum output is obtained or where the respective light receptors deliver an equal output at the same time. In other words, the output mirror is positioned at an optimum position on the substrate 2, and while it is maintained at this position, the U.V. irradiator irradiates the ultrasonic ray curing resin 24 with a ultraviolet ray, thus securing the output mirror to the substrate 2.

During the mounting of the output mirror, light emission is also caused from the laser diode 23, but it should be noted that what is measured by the measuring instrument 18 during the mounting of the output mirror is not light from the laser diode 23, but is laser beam which is driven into resonance between the reflecting surface 27 and the output mirror 28 and delivered through the output mirror 28.

When the output mirror 28 is disposed in following relationship with the solid state laser oscillator element 26 with a reflecting surface, it is excited by light from the laser diode 23 which transmits through the reflecting mirror 23, and the light is driven into resonance within the solid laser oscillator element 26 with a reflecting surface between the reflecting surface 27 and the output mirror 28. As the resonant power increases, the laser beam transmits through the output mirror 28 to be measured by the measuring instrument 18.

When the mounting of the output mirror is completed, the solid state laser oscillator element 26 with a reflecting surface and the output mirror 28 are fixedly mounted on the optical axis of the laser diode 23. Accordingly, the oscillator element 26 and the output mirror 28 are disposed on the optical axis of light which is emitted from the laser diode, thus permitting an improved laser beam output to be achieved as compared with a result achieved with a conventional manufacturing method.

In the described embodiment, a position where a solid state laser oscillator element is to be secured is searched for during the mounting thereof while causing light emission from the laser diode 23 and measuring light from the solid state laser oscillator element 26 with a reflecting surface by means of the measuring instrument 18. However, it should be understood that the invention is not limited to such an arrangement, but the laser oscillator element may be secured to the substrate 2 by utilizing a positioning process which takes place by using a camera in the similar manner as in the prior art, as indicated at No.2 in the chart shown in FIG. 3. In this instance, there remains a possibility that the optical axis of light from the solid state laser oscillator element 26 with a reflecting surface does not align with the optical axis of light from the laser diode 23, but an offset therebetween is minimal as is a reduction in the output. Again, the output can be improved as compared with a result obtained using a conventional manufacturing method.

Discussing this point more specifically, the light absorptance depends on the variety of solid state laser oscillator element. A solid state laser oscillator element having a high light absorptance will radiate light in a very limited range of frequencies while absorbing light of other frequencies, resulting in a reduced light intensity than for a solid state laser oscillator element having a lower light absorptance. Accordingly, for such a solid state laser oscillator element, the mounting must necessarily rely upon the use of a camera alone. By contrast, a solid state laser oscillator element having a lower light absorptance absorbs light radiated from laser diode 23 in a limited range of frequencies while allowing the remainder or the majority of light to pass therethrough, resulting in a reduced reduction in the light intensity. In such instance, it is possible to use the measuring instrument for purpose of measurement. However, it should be understood that the mounting may take place intentionally relying on the use of a camera alone, even for a solid state laser oscillator element which permits a measurement by the measuring instrument.

In the described embodiment, during the mounting of a solid state laser oscillator element, light emission from the laser diode 23 which is secured on the substrate 2 is caused, and the light emitted from the laser diode 23 is measured by the measuring instrument 18 in order to position the measuring instrument 18 onto the optical axis of such light. However, the invention is not limited to such an arrangement. Alternatively, as indicated at No.3 in the chart of FIG. 3, during the mounting of a solid state laser oscillator element, light emission may be caused from the laser diode 23 and light from the solid state laser oscillator element 26 with a reflecting surface may be measured by the measuring instrument 18 in order to position the measuring instrument 18 onto the optical axis of light from the oscillator element 26.

In the described embodiment, a sequence comprising the initial step of mounting the laser diode, followed by the mounting of the solid state laser oscillator element, which is in turn followed by the step of mounting the output mirror is employed. However, the invention is not limited to such sequence, but alternatively, the sequence of the mounting of the laser diode and the mounting of the solid state laser oscillator element may be interchanged as long as the step of mounting the output mirror comes to the last, as indicated at No. 4 in the chart. In this instance, the measuring instrument 18 is positioned on the optical axis of light from the solid state laser oscillator element 26 with a reflecting surface. Again, this manufacturing method improves the laser beam output in comparison to that achieved by using the conventional manufacturing method.

Also, in the described embodiment, during the step of the mounting of the laser diode, the measuring instrument 18 moves relative to the laser diode 23 which is secured to the substrate 2 in order to be positioned on the optical axis. But, the invention is not limited to such arrangement. As an alternative, the measuring instrument 18 may be positioned at a predetermined position while the laser diode 23 which is held attracted by the bonding tool 4 may be positioned at a position in the Y direction where a maximum output is obtained or where the respective light receptors deliver an equal output at the same time, a position having an angle of rotation about the Y axis where a maximum output is obtained or where the respective light receptors deliver an equal output at the same time, a position in the Z direction where a maximum output is obtained or where the respective light receptors deliver an equal output at the same time, and a position having an angle of rotation about the Z axis where a maximum output is obtained or where the respective light receptors deliver an equal output at the same time. While maintaining such condition, the U.V. irradiator may irradiate the ultraviolet ray curing resin 24 with a ultraviolet ray to secure the laser diode on the substrate, thus positioning the measuring instrument 23 on the optical axis of light from the laser diode in the similar manner as the used in the step of mounting the solid state laser oscillator element and the step of the mounting the output mirror, as indicated at No. 5 in the chart. In this instance, while not shown, some known means must be provided on the part of the bonding tool 4 which allows the laser diode 23 to be energized with a current. In this manner, a comparable result as obtained with the described embodiment can be achieved during the step of mounting the laser diode.

In the manufacturing method, which utilizes the step of mounting the laser diode mentioned above, light emission is caused from the laser diode 23 and light from the solid state laser oscillator element 26 with a reflecting surface is measured by the measuring instrument 18 in order to search for a position where it is to be secured. However, the invention is not limited to such arrangement, but a positioning with the aid of a camera alone may be relied upon to secure it to the substrate 2, as indicated at No. 6 in the chart.

In addition, it is not necessary that the execution of the step of mounting the output mirror be limited to a sequence in which it follows the execution of the step of mounting the laser diode and the step of mounting the solid state laser oscillator element. Alternatively, as long as the step of mounting the output mirror comes to the last, the order of executing the step of mounting the laser diode and the step of mounting the solid state laser may be interchanged as indicated at Nos. 7 and 9 shown in the chart. In this instance, the laser diode 23 or the solid state laser oscillator element 26 with a reflecting surface will be moved to and secured at a position where light from the solid state laser oscillator element 26 with a reflecting surface is at its maximum or where the respective light receptors deliver an equal output at the same time.

Additionally, as indicated Nos. 8 and 10, the laser diode 23 and the solid state laser oscillator element 26 with a reflecting surface may be secured on the substrate 2 by utilizing a positioning with the aid of a camera alone, and during the subsequent step of mounting the output mirror, light emission may be caused from the laser diode. The output mirror may be moved to and secured at a position where a maximum output is obtained or where the respective light receptors deliver an equal output at the same time. A variation in the output will be greatest in this instance among various manufacturing methods mentioned above. However, still, the laser beam output can be improved in comparison to a result achieved by the use of conventional manufacturing method.

In the described embodiment, the solid state laser oscillator element 26 is integrally provided with the reflecting surface 27, but the invention is not limited to such arrangement. Thus, the invention can utilize a solid state laser oscillator element 26 which is not provided with a reflecting surface 27. In this instance, a step of mounting a reflecting mirror on the substrate is used, separately from the step of mounting the solid state laser oscillator element, as indicated at No. 11 in the chart of FIG. 4.

In this instance, either the step of mounting the solid state laser oscillator element or the step of mounting the reflecting mirror may precede the other, as indicated at No. 12 in the chart. Such a manufacturing method achieves a comparable effect as achieved with the embodiment mentioned above.

As indicated at Nos. 13 to 18 in the chart, at least one of the reflecting mirror and the solid state laser oscillator element may be secured to the substrate 2 by a positioning which takes place with the aid of the camera alone. Such a manufacturing method still allows an improved laser beam output in comparison to a result achieved by a use of conventional manufacturing method.

As indicated at Nos. 19 to 22 in the chart of FIG. 4, the step of mounting a reflecting mirror is executed initially, and is followed by either the step of mounting a laser diode or the step of mounting a solid state laser oscillator element, the other of which takes place subsequently, thus securing the laser diode and the solid state laser oscillator element on the substrate. At this point, light emission is caused from the laser diode to measure light passing through the reflecting mirror or light passing through both the reflecting mirror and the solid state laser oscillator element or light passing through the reflecting mirror and radiated from the solid state laser oscillator element by the measuring instrument, which is then moved to a position where a maximum output is obtained or where the respective light receptors deliver an equal output at the same time, thus positioning it relative to the reflecting mirror or the solid state laser oscillator element. The step of mounting an output mirror then follows. During this step, light emission is caused from the laser diode to excite the solid state laser oscillator element, and light delivered from the output mirror is measured by the measuring instrument, thus allowing the output mirror to be moved to and secured at a position where a maximum output is obtained or where the respective light receptors deliver an equal output at the same time. Such a manufacturing method is also effective to provide an improved laser beam output in comparison to a result achieved by the use of a conventional manufacturing method.

As indicated at Nos. 23 to 26 in the chart of FIG. 4, the step of mounting a solid state laser oscillator element is executed initially, and is then followed by either the step of mounting a laser diode or the step of mounting a reflecting mirror, the other of which is executed subsequently, thus securing the laser diode and the reflecting mirror on the substrate. At this point, light emission is caused from the laser diode to allow a measurement by the measuring instrument of light passing through the solid state laser oscillator element, light radiated from the solid state laser oscillator element, light passing through both the reflecting mirror and the solid state laser oscillator element or light passing through the reflecting mirror and radiated from the solid state laser oscillator element. The measuring instrument is moved to a position where a maximum output is obtained or where the respective light receptors deliver an equal output at the same time, and thus is positioned relative to the solid state laser oscillator element. During a subsequent step of mounting an output mirror, light emission is again caused from the laser diode to excite the solid state laser oscillator element, and light delivered from the output mirror is measured by the measuring instrument. The output mirror is moved to and secured at a position where a maximum output is obtained or where the respective light receptors deliver an equal output at the same time. This manufacturing method still allows an improved laser beam output to be achieved in comparison to a result obtained by a use of conventional manufacturing method.

As indicated at Nos. 27 to 34 in the chart of FIG. 5, during the step of mounting a laser diode, a laser diode 23 which is held attracted by the bonding tool 4 is positioned at a position in the Y direction where a maximum output is obtained or where the respective light receptors deliver an equal output at the same time, a position having an angle of rotation about the Y axis where a maximum output is obtained or where the respective light receptors deliver an equal output at the same time, a position in the Z direction where a maximum output is obtained or where the respective light receptors deliver an equal output at the same time, and a position having an angle of rotation about the Z axis where a maximum output is obtained or where the respective light receptors deliver an equal output at the same time, relative to the measuring instrument 18 which is previously positioned at a given position. Under this condition, the U.V. irradiator irradiates the ultrasonic curing resin 24 with a ultraviolet ray to secure the laser diode on the substrate 2, thereby positioning the measuring instrument 23 on the optical axis of light from the laser diode 23.

As indicated at Nos. 35 to 42 in the chart of FIG. 5, during the step of mounting a laser diode, the laser diode 23 may be secured to the substrate 2 by a positioning which takes place with the aid of a camera. Subsequent operation proceeds in the same manner as mentioned above in connection with Nos. 27 to 34.

Each of the manufacturing methods as described above in connection with the variations Nos. 27 to 42 allows an improved laser beam output in comparison to a result achieved by the use of a conventional manufacturing method.

As indicated at Nos. 43 to 48 in the chart of FIG. 6, the step of mounting a reflecting mirror is executed initially, and is then followed by either the step of mounting a laser diode or the step of mounting a solid state laser oscillator element, the other of which takes place subsequently, thus securing the laser diode and the solid state laser oscillator element on the substrate. At this point, light emission is caused from the laser diode to allow a measurement by the measuring instrument of light passing through the reflecting mirror, light passing through both the reflecting mirror and the solid state laser oscillator element or light passing through the reflecting mirror and radiated from the solid state laser oscillator element, and the measuring instrument is positioned relative to the reflecting mirror or the solid state laser oscillator element by moving it to a position where a maximum output is obtained or where the respective light receptors deliver an equal output at the same time. During a subsequent step of mounting an output mirror, light emission is caused from the laser diode to excite the solid state laser oscillator element, and light delivered from the output mirror is measured by the measuring instrument. The output mirror is moved to and secured at a position where a maximum output is obtained or where the respective light receptors deliver an equal output at the same time. Such a manufacturing method is effective to provide an improved laser beam output in comparison to a result achieved by the use of conventional manufacturing method.

As indicated at Nos. 49 to 54 in the chart of FIG. 6, the step of mounting a solid state laser oscillator element is executed initially, and is then followed by either the step of mounting a laser diode or the step of mounting a reflecting mirror, the other of which takes place subsequently, thus securing the laser diode and the solid state laser oscillator element on the substrate. At this point, light emission is caused from the laser diode to allow a measurement by the measuring instrument of light passing through the solid state laser oscillator element, light radiated from the solid state laser oscillator element, light passing through both the reflecting mirror and the solid state laser oscillator element or light passing through the reflecting mirror and radiated from the solid state laser oscillator element. The measuring instrument is positioned relative to the solid state laser oscillator element by moving it to a position where a maximum output is obtained or where the respective light receptors deliver an equal output at the same time. During the subsequent step of mounting an output mirror, light emission is caused from the laser diode to excite the solid state laser oscillator element, and light delivered from the output mirror is measured by the measuring instrument. The output mirror is moved to and secured at a position where a maximum output is obtained or where the respective light receptors deliver an equal output at the same time. This manufacturing method is still effective to provide an improved laser beam output in comparison to a result achieved by the use of a conventional manufacturing method.

In the above description, the ultrasonic ray curing resin is used as an adhesive, but the invention is not limited to the use of the ultrasonic ray curing resin. For example, a thermosetting adhesive may be used, and may be hardened by application of heat thereto.

A non-linear optical crystal such as BBO, LBO, KTP or the like may be interposed between the solid state laser oscillator element and the output mirror for converting the wavelength of laser beam from the solid state laser.

In addition, a Q switch such as opto-acoustical element or electro-optical element may be interposed between the solid state laser oscillator element and the output mirror or between the non-linear optical crystal and the output mirror. Where the Q switch is used, it is necessary to provide a suitable means on the bonding tool which applies a high frequency voltage to the Q switch.

The step of mounting the non-linear optical crystal or the Q switch on the substrate 2 may take place substantially at the same time as the step of mounting an output mirror or either one of them may precede the other. However, it is necessary that the step of mounting the non-linear optical crystal or the Q switch be effected at least subsequent to the step of mounting the output mirror, namely, after laser beam is delivered from the output mirror 28.

While the invention has been disclosed above in connection with several embodiments, it should be understood that a number of changes, modifications and substitutions therein are possible from the above disclosure without departing from the spirit and scope of the invention defined by the appended claims.

What is claimed is:

1. A manufacturing method for a solid state laser comprising the steps of executing a mounting of a laser diode on a substrate, the mounting of the laser diode including the step of securing the laser diode at a given position on the substrate; causing light emission from the laser diode, measuring light emitted from the laser diode with a measuring instrument, and positioning the measuring instrument by moving it to a position where a maximum output is obtained or where a reference position on the measuring instrument aligns with the optical axis of light from the laser diode; executing a mounting of a solid state laser oscillator element with a reflecting surface to secure it at a given position on the substrate; and executing a mounting of an output mirror on the substrate, the mounting of the output mirror including the steps of causing light emission from the laser diode to excite the solid state laser oscillator element with a reflecting surface, measuring a laser beam delivered from the output mirror with the measuring instrument, and on the basis of a result of such measurement, moving the output mirror to a position where a maximum output is obtained or where the optical axis of the laser beam aligns with a reference position on the measuring instrument and securing the output mirror to the substrate at such position.

2. A manufacturing method for a solid state laser according to claim 1 in which the mounting of the solid state laser oscillator element comprises the steps of causing light emission from the laser diode which is secured to the substrate, measuring light passing through the solid state laser oscillator element with a reflecting surface or light radiated from the solid state laser oscillator element with a reflecting surface with the measuring instrument, and on the basis of a result of such measurement, moving the solid state laser oscillator element with a reflecting surface to a position where a maximum output is obtained or where the optical axis of light aligns with a reference position on the measuring instrument and securing the oscillator element to the substrate at such position.

3. A manufacturing method according to claim 2, in which the solid state laser oscillator element with a reflecting surface is previously applied with an adhesive to be adhesively bonded to the substrate in a movable manner, the adhesive being cured to secure the solid state laser oscillator element to the substrate upon its movement to the position where a maximum output is obtained or where a reference position on the measuring instrument aligns with the optical axis of light.

4. A manufacturing method according to claim 1 in which the measuring instrument includes at least three or more light receptors which are disposed symmetrically on a common plane, the reference position being defined as a center between the light receptors.

5. A manufacturing method according to claim 1 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

6. A manufacturing method according to claim 1 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to a position where a maximum output is obtained or where measured values of respective light receptors of the measuring instrument are at a relative proportion which is equal to a predetermined proportion and where the non-linear optical crystal is secured to the substrate.

7. A manufacturing method according to claim 1 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are at a relative proportion which is equal to a predetermined proportion and where the Q switch is secured to the substrate.

8. A manufacturing method according to claim 1 in which the solid state laser comprises either one of a non-linear optical crystal or a Q switch.

9. A manufacturing method for a solid state laser comprising the steps of executing a mounting of a solid state laser oscillator element with a reflecting surface on a substrate to secure it at a given position on the substrate; subsequently executing a mounting of a laser diode, the mounting of a laser diode including the steps of securing a laser diode at a given position on the substrate, causing light emission from the laser diode to allow a measurement with a measuring instrument of light passing through the solid state laser oscillator element with a reflecting surface or light radiated from the solid state laser oscillator element with a reflecting surface, and positioning the measuring instrument by moving it to a position where a maximum output is obtained or where a reference position on the measuring instrument aligns with the optical axis of light; and executing a mounting of an output mirror, the mounting of the output mirror including the steps of causing light emission from the laser diode to excite the solid state laser oscillator element with a reflecting surface, measuring a laser beam delivered from the output mirror with the measuring instrument, and on the basis of a result of such measurement, moving the output mirror to a position where a maximum output is obtained or where the optical axis of a laser beam aligns with a reference position on the measuring instrument and securing the output mirror to the substrate at such position.

10. A manufacturing method according to claim 9 in which the measuring instrument includes at least three or more light receptors which are disposed symmetrically on a common plane, the reference position being defined as a center between the light receptors.

11. A manufacturing method according to claim 9 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

12. A manufacturing method according to claim 9 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to position where a maximum output is obtained or where measured values of respective light receptors of the measuring instrument are at a relative proportion which is equal to a predetermined proportion and where the non-linear optical crystal is secured to the substrate.

13. A manufacturing method according to claim 9 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are a relative proportion which is equal to a predetermined proportion and where the Q which is secured to the substrate.

14. A manufacturing method according to claim 9 in which the solid state laser comprises either one of a non-linear optical crystal or a Q switch.

15. A manufacturing method for a solid state laser comprising the steps of executing a mounting of a laser diode to secure the laser diode at a given position on the substrate; executing a mounting of a solid state laser oscillator element with a reflecting surface, the mounting of the solid state laser oscillator element including the steps of securing the solid state laser oscillator element with a reflecting surface at a given position on the substrate, causing light emission from the laser diode while the solid state laser oscillator element remains secured, measuring light passing through the solid state laser oscillator element with a reflecting surface or light radiated from the solid state laser oscillator element with a reflecting surface with a measuring instrument, positioning the measuring instrument by moving it to a position where a maximum output is obtained or where a reference position on the measuring instrument aligns with an optical axis of light; and executing a mounting of an output mirror, the mounting of the output mirror including the steps of causing light emission from the laser diode to excite the solid state laser oscillator element with a reflecting surface, measuring a laser beam delivered from the output mirror with the measuring instrument, and on the basis of a result of such measurement, moving the output mirror to a position where a maximum output is obtained or where the optical axis of laser beam aligns with a reference position on the measuring instrument and securing the output mirror to the substrate at such position.

16. A manufacturing method according to claim 15 in which the measuring instrument includes at least three or more light receptors which are disposed symmetrically on a common plane, the reference position being defined as a center between the light receptors.

17. A manufacturing method according to claim 15 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

18. A manufacturing method according to claim 15 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to a position where a maximum output is obtained or where measured values of respective light receptors of the measuring instrument are at a relative proportion which is equal to a predetermined proportion and where the non-linear optical crystal is secured to the substrate.

19. A manufacturing method according to claim 15 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are at a relative proportion which is equal to a predetermined proportion and where the Q switch is secured to the substrate.

20. A manufacturing method according to claim 15 in which the solid state laser comprises either one of a non-linear optical crystal or a Q switch.

21. A manufacturing method for a solid state laser comprising the steps of executing a mounting of a laser diode and a mounting of a solid state laser oscillator element with a reflecting surface to secure the laser diode and the solid state laser oscillator element with a reflecting surface at given positions on a substrate, subsequently executing a mounting of an output mirror, the mounting of the output mirror including the steps of causing light emission from the laser diode to excite the solid state laser oscillator element with a reflecting surface, measuring a laser beam delivered from the output mirror with a measuring instrument, and on the basis of a result of such measurement, moving the output mirror to a position where a maximum output is obtained or where the optical axis of the laser beam aligns with a reference position on the measuring instrument and securing the output mirror to the substrate at such position.

22. A manufacturing method according to claim 21 in which the mounting of the laser diode precedes the mounting of the solid state laser oscillator element to secure the laser diode at a given position on the substrate, the mounting of the solid state laser oscillator element including the steps of causing light emission from the laser diode to allow the measurement by the measuring instrument of light passing through the solid state laser oscillator element with a reflecting surface or light radiated from the solid state laser oscillator element with a reflecting surface, and on the basis of a result of such measurement, moving the solid state laser oscillator element with a reflecting surface to a position where a maximum output is obtained or where the optical axis of light aligns with a reference position on the measuring instrument and securing the solid state laser oscillator element to the substrate at such position.

23. A manufacturing method according to claim 22 in which the solid state laser oscillator element with a reflecting surface is previously applied with an adhesive to be adhesively bonded to the substrate in a movable manner, the adhesive being cured to secure the solid state laser oscillator element to the substrate upon its movement to the position where a maximum output is obtained or where a reference position on the measuring instrument aligns with the optical axis of light.

24. A manufacturing method according to claim 21 in which the mounting of the laser diode comprises the steps of causing light emission from the laser diode, measuring light radiated from the laser diode with the measuring instrument, and on the basis of a result of such measurement, moving the laser diode to a position where a maximum output is obtained or where the optical axis of light aligns with a reference position on the measuring instrument and securing the laser diode to the substrate at such position.

25. A manufacturing method according to claim 24 in which the laser diode is previously applied with an adhesive and is adhesively bonded to the substrate in a movable manner, the adhesive being cured to secure the laser diode to the substrate upon its movement to the position where a maximum output is obtained or where a reference position on the measuring instrument aligns with the optical axis of light.

26. A manufacturing method according to claim 24 in which the solid state laser oscillator element with a reflecting surface is previously applied with an adhesive to be adhesively bonded to the substrate in a movable manner, the adhesive being cured to secure the solid state laser oscillator element to the substrate upon its movement to the position where a maximum output is obtained or where a reference position on the measuring instrument aligns with the optical axis of light.

27. A manufacturing method according to claim 21 in which the mounting of the solid state laser oscillator element precedes the mounting of the laser diode to secure the solid state laser oscillator element with a reflecting surface at a given position on the substrate, and a subsequent mounting of the laser diode including the steps of causing light emission from the laser diode, measuring light passing through the solid state laser oscillator element with a reflecting surface or light radiated from the solid state laser oscillator element with a reflecting surface with the measuring instrument, and moving the laser diode to a position where a maximum output is obtained or where the optical axis of light aligns with a reference position on the measuring instrument and securing the laser diode to the substrate at such position.

28. A manufacturing method according to claim 21 in which the measuring instrument includes at least three or more light receptors which are disposed symmetrically on a common plane, the reference position being defined as a center between the light receptors.

29. A manufacturing method according to claim 21 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

30. A manufacturing method according to claim 21 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to a position where a maximum output is obtained or where measured values of respective light receptors of the measuring instrument are at a relative proportion which is equal to a predetermined proportion and where the non-linear optical crystal is secured to the substrate.

31. A manufacturing method according to claim 21 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are at a relative proportion which is equal to a predetermined proportion and where the Q switch is secured to the substrate.

32. A manufacturing method according to claim 21 in which the solid state laser comprises either one of a non-linear optical crystal or a Q switch.

33. A manufacturing method for a solid state laser comprising the steps of executing a mounting of a laser diode, the mounting of the laser diode including the steps of securing the laser diode at a given position on the substrate; causing light emission from the laser diode, measuring light radiated from the laser diode with a measuring instrument, and moving the measuring instrument to a position where a maximum output is obtained or where a reference position on the measuring instrument aligns with the optical axis of light; subsequently executing a mounting of a reflecting mirror and a mounting of a solid state laser oscillator element to secure the reflecting mirror and the solid state laser oscillator element at given positions on the substrate; and subsequently executing a mounting of an output mirror, the mounting of the output mirror including the steps of causing light emission from the laser diode to excite the solid state laser oscillator element, measuring a laser beam delivered from the output mirror with the measuring instrument, and on the basis of a result of such measurement, moving the output mirror to a position where a maximum output is obtained or where the optical axis of the laser beam aligns with a reference position on the measuring instrument and securing the output mirror to the substrate at such position.

34. A manufacturing method according to claim 33 in which either the mounting of the reflecting mirror or the mounting of the solid state laser oscillator element comprises the steps of causing light emission from the laser diode, measuring light passing through the reflecting mirror, light passing through the solid state laser oscillator element or light radiated from the solid state laser oscillator element with the measuring instrument, and on the basis of a result of such measurement, moving at least one of the reflecting mirror and the solid state laser oscillator element to a position where a maximum output is obtained or where the optical axis of light aligns with a reference position on the measuring instrument and securing said at least one of the reflecting mirror and the solid state laser oscillator element to the substrate at such position.

35. A manufacturing method according to claim 34, in which the reflecting mirror is previously applied with an adhesive and is adhesively bonded to the substrate in a movable manner, the adhesive being cured to secure the reflecting mirror to the substrate upon its movement to the position where a maximum output is obtained or where a reference position on the measuring instrument aligns with the optical axis of light.

36. A manufacturing method according to claim 34 in which the solid state laser oscillator element is previously applied with an adhesive and is adhesively bonded to the substrate in a movable manner, the adhesive being cured to secure the solid state laser oscillator element to the substrate upon its movement to the position where a maximum output is obtained or where a reference position on the measuring instrument aligns with the optical axis of light.

37. A manufacturing method according to claim 33 in which the measuring instrument includes at least three or more light receptors which are disposed symmetrically on a common plane, the reference position being defined as a center between the light receptors.

38. A manufacturing method according to claim 33 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

39. A manufacturing method according to claim 33 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to a position where a maximum output is obtained or where measured values of respective light receptors of the measuring instrument are at a relative proportion which is equal to a predetermined proportion and where the non-linear optical crystal is secured to the substrate.

40. A manufacturing method according to claim 33 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are at a relative proportion which is equal to a predetermined proportion and where the Q switch is secured to the substrate.

41. A manufacturing method according to claim 33 in which the solid state laser comprises either one of a non-linear optical crystal or a Q switch.

42. A manufacturing method for a solid state laser comprising the steps of executing a mounting of a reflecting mirror to secure the reflecting mirror at a given position on the substrate; subsequently executing the mounting of a laser diode, the mounting of a laser diode including the steps of securing the laser diode at a given position on the substrate, causing light emission from the laser diode, measuring light passing through the reflecting mirror with a measuring instrument, and positioning the measuring instrument by moving it to a position where a maximum output is obtained or where a reference position on the measuring instrument aligns with the optical axis of light; subsequently executing a mounting of a solid state laser oscillator element to secure the solid state laser oscillator element at a given position on the substrate; and subsequently executing a mounting of an output mirror, the mounting of the output mirror comprising the steps of causing light emission from the laser diode to excite the solid state laser oscillator element, measuring a laser beam delivered from the output mirror with the measuring instrument, and on the basis of a result of such measurement, moving the output mirror to a position where a maximum output is obtained or where the optical axis of the laser beam aligns with a reference position on the measuring instrument and securing the output mirror to the substrate at such position.

43. A manufacturing method according to claim 42 in which the mounting of the solid state laser oscillator element comprises the steps of causing light emission from the laser diode, measuring light passing through the solid state laser oscillator element or light radiated from the solid state laser oscillator element with the measuring instrument, on the basis of a result of such measurement, moving the solid state laser oscillator element to a position where a maximum output is obtained or where a reference position on the measuring instrument aligns with the optical axis of the laser beam and securing the solid state laser oscillator element to the substrate at such position.

44. A manufacturing method according to claim 43 in which the solid state laser oscillator element is previously applied with an adhesive and is adhesively bonded to the substrate in a movable manner, the adhesive being cured to secure the solid state laser oscillator element to the substrate upon its movement to the position where a maximum output is obtained or where a reference position on the measuring instrument aligns with the optical axis of the laser beam.

45. A manufacturing method according to claim 42 in which the measuring instrument includes at least three or more light receptors which are disposed symmetrically on a common plane, the reference position being defined as a center between the light receptors.

46. A manufacturing method according to claim 42 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

47. A manufacturing method according to claim 42 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to a position where a maximum output is obtained or where measured values of respective light receptors of the measuring instrument are at a relative proportion which is equal to a predetermined proportion and where the non-linear optical crystal is secured to the substrate.

48. A manufacturing method according to claim 42 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are at a relative proportion which is equal to a predetermined proportion and where the Q switch is secured to the substrate.

49. A manufacturing method according to claim 42 in which the solid state laser comprises either one of a non-linear optical crystal or a Q switch.

50. A manufacturing method for a solid state laser comprising the steps of executing a mounting of a reflecting mirror to secure the reflecting mirror at a given position on the substrate; subsequently executing a mounting of a laser diode and a mounting of a solid state laser oscillator element, the mounting of the laser diode and the mounting of the solid state laser oscillator element comprising the steps of securing the laser diode and the solid state laser oscillator element at given positions on the substrate, causing light emission from the laser diode, measuring light passing through the reflecting mirror and the solid state laser oscillator element or light passing through the reflecting mirror and radiated from the solid state laser oscillator element with a measuring instrument, and positioning the measuring instrument by moving it to a position where a maximum output is obtained or where a reference position on the measuring instrument aligns with the optical axis of light; and subsequently executing a mounting of an output mirror, the mounting of the output mirror comprising the steps of causing light emission from the laser diode to excite the solid state laser oscillator element, measuring a laser beam delivered from the output mirror with the measuring instrument, and on the basis of a result of such measurement, moving the output mirror to a position where a maximum output is obtained or where the optical axis of the laser beam aligns with a reference position on the measuring instrument and securing the output mirror to the substrate at such position.

51. A manufacturing method according to claim 50 in which the measuring instrument includes at least three or more light receptors which are disposed symmetrically on a common plane, the reference position being defined as a center between the light receptors.

52. A manufacturing method according to claim 50 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

53. A manufacturing method according to claim 50 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to a position where a maximum output is obtained or where measured values of respective light receptors of the measuring instrument are at a relative proportion which is equal to a predetermined proportion and where the non-linear optical crystal is secured to the substrate.

54. A manufacturing method according to claim 50 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are at a relative proportion which is equal to a predetermined proportion and where the Q switch is secured to the substrate.

55. A manufacturing method according to claim 50 in which the solid state laser comprises either one of a non-linear optical crystal or a Q switch.

56. A manufacturing method for a solid state laser comprising the steps of executing a mounting of a solid state laser oscillator element to secure the solid state laser oscillator element at a given position on a substrate; then executing a mounting of a laser diode, the mounting of the laser diode including the steps of causing light emission from the laser diode, measuring light passing through the solid state laser oscillator element or light radiated from the solid state laser oscillator element with a measuring instrument, and positioning the measuring instrument by moving it to a position where a maximum output is obtained or where a reference position on the measuring instrument aligns with the optical axis of light; subsequently executing a mounting of a reflecting mirror to secure the reflecting mirror at a given position on the substrate; and subsequently executing a mounting of an output mirror, the mounting of the output mirror including the steps of causing light emission from the laser diode to excite the solid state laser oscillator element, measuring a laser beam delivered from the output mirror with the measuring instrument, and on the basis of a result of such measurement, moving the output mirror to a position where a maximum output is obtained or where the optical axis of the laser beam aligns with a reference position on the measuring instrument and securing the output mirror to the substrate at such position.

57. A manufacturing method according to claim 56 in which the mounting of the reflecting mirror includes the steps of causing light emission from the laser diode, measuring light passing through the reflecting mirror with the measuring instrument, and on the basis of such measurement, moving the reflecting mirror to a position where a maximum output is obtained or where a reference position on the measuring instrument aligns with the optical axis of light and securing the reflecting mirror to the substrate at such position.

58. A manufacturing method according to claim 57 in which the reflecting mirror is previously applied with an adhesive and is adhesively bonded to the substrate in a movable manner, the adhesive being cured to secure the reflecting mirror to the substrate upon its movement to the position where a maximum output is obtained or where a reference position on the measuring instrument aligns with the optical axis of light.

59. A manufacturing method according to claim 56 in which the measuring instrument includes at least three or more light receptors which are disposed symmetrically on a common plane, the reference position being defined as a center between the light receptors.

60. A manufacturing method according to claim 56 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

61. A manufacturing method according to claim 56 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to a position where a maximum output is obtained or where measured values of respective light receptors of the measuring instrument are at a relative proportion which is equal to a predetermined proportion and where the non-linear optical crystal is secured to the substrate.

62. A manufacturing method according to claim 56 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are at a relative proportion which is equal to a predetermined proportion and where the Q switch is secured to the substrate.

63. A manufacturing method according to claim 56 in which the solid state laser comprises either one of a non-linear optical crystal or a Q switch.

64. A manufacturing method for a solid state laser comprising the steps of executing a mounting of a solid state laser oscillator element to secure the solid state laser oscillator element at a given position on a substrate; then executing a mounting of a laser diode and a mounting of a reflecting mirror, the mounting of the laser diode and the mounting of the reflecting mirror including the steps of securing the laser diode and the reflecting mirror at given positions on the substrate, causing light emission from the laser diode, measuring light passing through the reflecting mirror and the solid state laser oscillator element or light passing though the reflecting mirror and radiated from the solid state laser oscillator element with a measuring instrument, and positioning the measuring instrument by moving it to a position where a maximum output is obtained or where a reference position on the measuring instrument aligns with the optical axis of light; and subsequently executing a mounting of an output mirror, the mounting of the output mirror comprising the steps of causing light emission from the laser diode to excite the solid state laser oscillator element, measuring a laser beam delivered from the output light with the measuring instrument, and on the basis of a result of such measurement, moving the output mirror to a position where a maximum output is obtained or where the optical axis of the laser beam aligns with a reference position on the measuring instrument and securing the output mirror to the substrate at such position.

65. A manufacturing method according to claim 64 in which the measuring instrument includes at least three or more light receptors which are disposed symmetrically on a common plane, the reference position being defined as a center between the light receptors.

66. A manufacturing method according to claim 64 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

67. A manufacturing method according to claim 64 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to a position where a maximum output is obtained or where measured values of respective light receptors of the measuring instrument are at a relative proportion which is equal to a predetermined proportion and where the non-linear optical crystal is secured to the substrate.

68. A manufacturing method according to claim 64 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are at a relative proportion which is equal to a predetermined proportion and where the Q switch is secured to the substrate.

69. A manufacturing method according to claim 64 in which the solid state laser comprises either one of a non-linear optical crystal or a Q switch.

70. A manufacturing method for a solid state laser comprising the steps of executing a mounting of a laser diode to secure it, a mounting of a reflecting mirror to secure it and a mounting of a solid state laser oscillator element to secure it, thus securing the laser diode, the reflecting mirror and the solid state laser oscillator element at given positions on a substrate; and subsequently executing a mounting of an output mirror, the mounting of the output mirror including the steps of causing light emission from the laser diode to excite the solid state laser oscillator element, measuring a laser beam delivered from the output mirror with a measuring instrument, and on the basis of a result of such measurement, moving the output mirror to a position where a maximum output is obtained or where the optical axis of the laser beam aligns with a reference position on the measuring instrument and securing the output mirror to the substrate at such position.

71. A manufacturing method according to claim 70 in which the mounting of the laser diode precedes the mounting of the reflecting mirror and the mounting of the solid state laser oscillator element, and after the laser diode is secured at a given position on the substrate, at least one of the mounting of the reflecting mirror and the mounting of the solid state laser oscillator element taking place and comprising the steps of causing light emission from the laser diode, measuring light passing through the reflecting mirror, light passing through the solid state laser oscillator element or light radiated from the solid state laser oscillator element with the measuring instrument, moving at least one of the reflecting mirror and the solid state laser oscillator element to a position where a maximum output is obtained or where the optical axis of light aligns with a reference position on the measuring instrument and securing it to the substrate at such position.

72. A manufacturing method according to claim 71 in which the reflecting mirror is previously applied with an adhesive and is adhesively bonded to the substrate in a movable manner, the adhesive being cured to secure the reflecting mirror to the substrate upon its movement to the position where a maximum output is obtained or where a reference position on the measuring instrument aligns with the optical axis of light.

73. A manufacturing method according to claim 71 in which the solid state laser oscillator element is previously applied with an adhesive and is adhesively bonded to the substrate in a movable manner, the adhesive being cured to secure the solid state laser oscillator element to the substrate upon its movement to the position where a maximum output is obtained or where a reference position on the measuring instrument aligns with the optical axis of light.

74. A manufacturing method according to claim 70 in which the mounting of the laser diode comprising the steps of causing light emission from the laser diode, measuring light radiated from the laser diode with the measuring instrument, and on the basis of a result of such measurement, moving the laser diode to a position where a maximum output is obtained or where the optical axis of light aligns with a reference position on the measuring instrument and securing the laser diode to the substrate at such position.

75. A manufacturing method according to claim 71 in which the reflecting mirror is previously applied with an adhesive and is adhesively bonded to the substrate in a movable manner, the adhesive being cured to secure the reflecting mirror to the substrate upon its movement to the position where a maximum output is obtained or where a reference position on the measuring instrument aligns with the optical axis of light.

76. A manufacturing method according to claim 22 in which the solid state laser oscillator element is previously applied with an adhesive and is adhesively bonded to the substrate in a movable manner, the adhesive being cured to secure the solid state laser oscillator element to the substrate upon its movement to the position where a maximum output is obtained or where a reference position on the measuring instrument aligns with the optical axis of light.

77. A manufacturing method according to claim 74 in which the laser diode is previously applied with an adhesive and is adhesively bonded to the substrate in a movable manner, the adhesive being cured to secure the laser diode to the substrate upon its movement to the position where a maximum output is obtained or where a reference position on the measuring instrument aligns with the optical axis of light.

78. A manufacturing method according to claim 70 in which the mounting of the reflecting mirror precedes in execution the mounting of the laser diode and the mounting of the solid state laser oscillator element to secure the reflecting mirror at a given position on the substrate, followed by the execution of the mounting of the laser diode and the mounting of the solid state laser oscillator element, at least one of the mounting of the laser diode and the mounting of the solid state laser oscillator element comprising the steps of causing light emission from the laser diode, measuring light passing through the reflecting mirror, light passing through the reflecting mirror and the solid state laser oscillator element or light passing through the reflecting mirror and radiated from the solid state laser oscillator element with the measuring instrument, and on the basis of a result of such measurement, moving at least one of the laser diode and the solid state laser oscillator element to a position where a maximum output is obtained or where the optical axis of light aligns with a reference position on the measuring instrument and securing it to the substrate at such position.

79. A manufacturing method according to claim 78 in which the solid state laser oscillator element is previously applied with an adhesive and is adhesively bonded to the substrate in a movable manner, the adhesive being cured to secure the solid state laser oscillator element to the substrate upon its movement to the position where a maximum output is obtained or where a reference position on the measuring instrument aligns with the optical axis of light.

80. A manufacturing method according to claim 78 in which the laser diode is previously applied with an adhesive and is adhesively bonded to the substrate in a movable manner, the adhesive being cured to secure the laser diode to the substrate upon its movement to the position where a maximum output is obtained or where a reference position on the measuring instrument aligns with the optical axis of light.

81. A manufacturing method according to claim 70 in which after the mounting of the solid state laser oscillator element is executed to secure the solid state laser oscillator element at a given position on the substrate, the mounting of the laser diode and the mounting of the reflecting mirror are executed, at least one of the mounting of the laser diode and the mounting of the reflecting mirror comprising the steps of causing light emission from the laser diode, measuring light passing through the solid state laser oscillator element, light radiated from the solid state laser oscillator element, light passing through the reflecting mirror and the solid state laser oscillator element or light passing through the reflecting mirror and radiated from the solid state laser oscillator element with the measuring instrument, and on the basis of a result of such measurement, moving at least one of the laser diode and the reflecting mirror to a position where a maximum output is obtained or where the optical axis of light or the optical axis of the laser beam aligns with a reference position on the measuring instrument and securing it to the substrate at such position.

82. A manufacturing method according to claim 81 in which the reflecting mirror is previously applied with an adhesive and is adhesively bonded to the substrate in a movable manner, the adhesive being cured to secure the reflecting mirror to the substrate upon its movement to the position where a maximum output is obtained or where a reference position on the measuring instrument aligns with the optical axis of light.

83. A manufacturing method according to claim 81 in which the laser diode is previously applied with an adhesive and is adhesively bonded to the substrate in a movable manner, the adhesive being cured to secure the laser diode to the substrate upon its movement to the position where a maximum output is obtained or where a reference position on the measuring instrument aligns with the optical axis of the laser beam.

84. A manufacturing method according to claim 70 in which the measuring instrument includes at least three or more light receptors which are disposed symmetrically on a common plane, the reference position being defined as a center between the light receptors.

85. A manufacturing method according to claim 70 in which the output mirror is previously applied with an adhesive and is adhesively bonded to the substrate in a movable manner, the adhesive being cured to secure the output mirror to the substrate upon its movement to the position where a maximum output is obtained or where a reference position on the measuring instrument aligns with the optical axis of the laser beam.

86. A manufacturing method according to claim 70 in which the solid state laser includes a non-linear optical element which converts the wavelength of a laser beam from the solid state laser oscillator element, the laser beam from the solid state laser oscillator element which passes through the non-linear optical crystal being measured by the measuring instrument, the non-linear optical crystal being moved to a position where a maximum output is obtained or where measured values of respective light receptors of the measuring instrument are at a relative proportion which is equal to a predetermined proportion and where the non-linear optical crystal is secured to the substrate.

87. A manufacturing method according to claim 70 in which the solid state laser includes a Q switch which comprises an opto-acoustical element or electro-optical element, a laser beam from the solid state laser oscillator element which passes through the Q switch being measured by the measuring instrument, the Q switch being moved to a position where a maximum output is obtained or where measured values of respective light receptors in the measuring instrument are at a relative proportion which is equal to a predetermined proportion and where the Q switch is secured to the substrate.

88. A manufacturing method according to claim 70 in which the solid state laser comprises either one of a non-linear optical crystal or a Q switch.

* * * * *

UNITED STATES PATENT AND TRADEMARK OFFICE
CERTIFICATE OF CORRECTION

PATENT NO : 6 122 307
DATED : September 19, 2000
INVENTOR(S) : Ryoji KOSEKI

It is certified that error appears in the above-identified patent and that said Letters Patent are hereby corrected as shown below:

Claim 9, line 62; replace "a" with ---the---.

Claim 12, line 19; after "to" insert ---a---.

Claim 13, line 33; replace "which" with ---switch---.

Claim 15, line 62; before "laser" insert ---the---.

Claim 35, line 67; replace "a" (second occurrence) with ---the---.

Claim 27; cancel in its entirety.

Signed and Sealed this

Eighth Day of May, 2001

Attest:

NICHOLAS P. GODICI

Attesting Officer

Acting Director of the United States Patent and Trademark Office